(12) United States Patent
Weaver et al.

(10) Patent No.: US 10,799,922 B2
(45) Date of Patent: Oct. 13, 2020

(54) SYSTEM FOR NEUTRALIZING PRESCRIPTION DRUGS, NARCOTICS AND OTHER HARMFUL SUBSTANCES AND A METHOD OF MAKING AND USING SAME

(71) Applicant: Phantom Operations, LLC, Tamaqua, PA (US)

(72) Inventors: Ty S. Weaver, Tamaqua, PA (US); Robert D. Cook, Collegeville, PA (US); Dean C. Klipple, Clarks Summit, PA (US)

( * ) Notice: Subject to any disclaimer, the term of this patent is extended or adjusted under 35 U.S.C. 154(b) by 162 days.

(21) Appl. No.: 16/128,961

(22) Filed: Sep. 12, 2018

(65) Prior Publication Data
US 2020/0078839 A1 Mar. 12, 2020

(51) Int. Cl.
*B09B 3/00* (2006.01)
*B02C 19/00* (2006.01)

(52) U.S. Cl.
CPC ........ *B09B 3/0008* (2013.01); *B02C 19/0075* (2013.01); *B09B 3/0075* (2013.01)

(58) Field of Classification Search
CPC . B09B 3/0075; B09B 3/0008; B02C 19/0075; A61L 11/00; A62D 3/30
See application file for complete search history.

(56) References Cited

U.S. PATENT DOCUMENTS 9,302,134 B1 * 4/2016 Nelson .................... A62D 3/30
9,403,197 B2    8/2016 Dallas et al.

* cited by examiner

*Primary Examiner* — Lessanework Seifu
(74) *Attorney, Agent, or Firm* — Zale Patent Law, Inc.

(57) ABSTRACT

A system for neutralizing prescription drugs, narcotics and other harmful substances, including a staging area for an initial collection and sorting of prescription drugs, narcotics and other harmful substances to be neutralized, a containment chamber assembly operatively connected to the staging area for granulating the prescription drugs, narcotics and other harmful substances, a waste grinder/vacuum assembly operatively connected to the containment chamber for destroying any packaging that contained the prescription drugs, narcotics and other harmful substances, and a neutralizing assembly operatively connected to the containment chamber for neutralizing the granulated prescription drugs, narcotics and other harmful substances, with a neutralizing agent.

17 Claims, 5 Drawing Sheets

SYSTEM FOR NEUTRALIZING PRESCRIPTION DRUGS, NARCOTICS AND OTHER HARMFUL SUBSTANCES AND A METHOD OF MAKING AND USING SAME

FIELD OF THE INVENTION

The present invention is generally related to a system and method for neutralizing prescription drugs, narcotics and other harmful substances (organic targeted compounds). The system uses commercially available carbon-based compounds which have been proven to be effective in the adsorption and neutralization of the targeted compounds, thus rendering them "unrecoverable". The system will be made available to law enforcement/federal/state/local government agencies as well as the pharmaceutical industry as a resource to eliminate targeted compounds in a safe and environmentally friendly process. Finally, this system can be provided in a number of configurations, depending on the needs and ability of the customer as it is scalable in nature and flexible for specific targets.

BACKGROUND OF THE INVENTION

It is known that there are several ways to dispose of prescription drugs, narcotics and other harmful substances. Such well-known methods include pouring the prescription drugs, narcotics and other harmful substances down the drain, dumping the prescription drugs, narcotics and other harmful substances into a toilet and flushing the toilet, and incinerating the prescription drugs, narcotics and other harmful substances. While these methods are able to dispose of the prescription drugs, narcotics and other harmful substances, there are harmful residual effects from using any of these methods. For example, if one was to dispose of the prescription drugs, narcotics and other harmful substances by pouring them down the drain or flushing them down a toilet, the prescription drugs, narcotics and other harmful substances can end up in the eco-system and adversely affect the drinking water, the wildlife and the plant life. Also, if one was to dispose of the prescription drugs, narcotics and other harmful substances by incinerating them, the smoke and debris from the burned prescription drugs, narcotics and other harmful substances could adversely affect the air quality. It is to be understood that additionally, and equally important, is the risk of the prescription drugs, narcotics and other harmful substances re-entering the public through stockpiling, theft and poor inventory control so there is a need to be able to properly dispose of the prescription drugs, narcotics and other harmful substances.

It is also known to use various commercially available kits that allow one to dispose of the prescription drugs, narcotics and other harmful substances (targeted compounds) by placing the prescription drugs, narcotics and other harmful substances in a container that contains a neutralizing agent. The end user then adds a liquid such as water to the targeted compounds in the container and seals the container. The interaction between the liquid and the neutralizing agent causes the prescription drugs, narcotics and other harmful substances to become neutralized. While this system is able to neutralize the targeted compounds, the size of the container prohibits large quantities of prescription drugs, narcotics and other harmful substances from being neutralized over a short period of time. Additionally, the current method, using smaller containers without "granulating" and "agitating" the target material and neutralizing agent which can lead to an excessive "dwell-time" and, therefore, extend the costs to operate and process.

Finally, prior to the present invention, as set forth in general terms above and more specifically below, it is known, to employ a system for neutralizing medical waste. See for example, U.S. Pat. No. 9,403,197 by Dallas et al. While this system for neutralizing medical waste may have been generally satisfactory, there is nevertheless a need for a new and improved system and method for neutralizing prescription drugs, narcotics and other harmful substances.

It is a purpose of this invention to fulfill these and other needs in the art of neutralizing prescription drugs, narcotics and other harmful substances in a manner more apparent to the skilled artisan once given the following disclosure.

BRIEF SUMMARY OF THE INVENTION

A first aspect of the present invention is a system for neutralizing prescription drugs, narcotics and other harmful substances, including a staging area for an initial collection and sorting of prescription drugs, narcotics and other harmful substances to be neutralized, a containment chamber assembly operatively connected to the staging area for granulating the prescription drugs, narcotics and other harmful substances, a waste grinder/vacuum assembly operatively connected to the containment chamber for destroying any packaging that contained the prescription drugs, narcotics and other harmful substances, and a neutralizing assembly operatively connected to the containment chamber for neutralizing the granulated prescription drugs, narcotics and other harmful substances, with a neutralizing agent.

In one embodiment of the first aspect of the present invention, the system further includes a back-up drum assembly located adjacent to the neutralizing assembly.

In another embodiment of the first aspect of the present invention, the staging area further includes a scale, and a database for storing information related to the prescription drugs, narcotics and other harmful substances that have been collected and sorted.

In a further embodiment of the first aspect of the present invention, the containment chamber assembly further includes a containment chamber, a waste material grinder/vacuum system entry point operatively connected to the containment chamber, wherein the packaging that contained the prescription drugs, narcotics and other harmful substances is introduced into the waste material grinder/vacuum system entry point, a granulator entry point located within the containment chamber, and a granulator operatively connected to the granulator entry point for granulating the prescription drugs, narcotics and other harmful substances.

In a yet another embodiment of the first aspect of the present invention, the waste grinder/vacuum assembly further includes a grinder operatively connected to the waste material grinder/vacuum system entry point, and a grinder vacuum operatively connected to the grinder.

In a yet further embodiment of the first aspect of the present invention, the neutralizing assembly further includes a primary neutralizing drum, a vacuum pre-separator operatively connected to the primary neutralizing drum and the containment chamber assembly, an agitator operatively connected to the primary neutralizing drum, a particulate air vacuum operatively connected to the vacuum pre-separator, and a secondary neutralizing drum operatively connected to the particulate air vacuum.

In a still another embodiment of the first aspect of the present invention, the back-up drum assembly further includes a plurality of back-up drums.

In a still further embodiment of the first aspect of the present invention, the primary neutralizing drum and the secondary neutralizing drum further include an initial final fill line such that the initial fill line is placed at a predetermined location on each of the primary neutralizing drum and the secondary neutralizing drum, and a final fill line such that the final fill line is placed at a predetermined location on each of the primary neutralizing drum and the secondary neutralizing drum and the final fill line is located above the initial fill line.

A second aspect of the present invention is a system for rendering inert carbon-based targeted compounds, including a staging area for an initial collection and sorting of carbon-based targeted compounds to be rendered inert, a containment chamber assembly operatively connected to the staging area for granulating the carbon-based targeted compounds, a waste grinder/vacuum assembly operatively connected to the containment chamber for destroying any packaging that contained the carbon-based targeted compounds, a neutralizing assembly operatively connected to the containment chamber for rendering inert the granulated carbon-based targeted compounds with a neutralizing agent, and a back-up drum assembly located adjacent to the neutralizing assembly.

In another embodiment of the second aspect of the present invention, the staging area further includes a scale, and a database for storing information related to the prescription drugs, narcotics and other harmful substances that have been collected and sorted.

In a further embodiment of the second aspect of the present invention, the containment chamber assembly further includes a containment chamber, a waste material grinder/vacuum system entry point operatively connected to the containment chamber, wherein the packaging that contained the prescription drugs, narcotics and other harmful substances is introduced into the waste material grinder/vacuum system entry point, a granulator entry point located within the containment chamber, and a granulator operatively connected to the granulator entry point for granulating the prescription drugs, narcotics and other harmful substances.

In a yet another embodiment of the second aspect of the present invention, the waste grinder/vacuum assembly further includes a grinder operatively connected to the waste material grinder/vacuum system entry point, and a grinder vacuum operatively connected to the grinder.

In a yet further embodiment of the second aspect of the present invention, the neutralizing assembly further includes a primary neutralizing drum, a vacuum pre-separator operatively connected to the primary neutralizing drum and the containment chamber assembly, an agitator operatively connected to the primary neutralizing drum, a particulate air vacuum operatively connected to the vacuum pre-separator, and a secondary neutralizing drum operatively connected to the particulate air vacuum.

In a still another embodiment of the second aspect of the present invention, the back-up drum assembly further includes a plurality of back-up drums.

In a still further embodiment of the second aspect of the present invention, the primary neutralizing drum and the secondary neutralizing drum further include an initial final fill line such that the initial fill line is placed at a predetermined location on each of the primary neutralizing drum and the secondary neutralizing drum, and a final fill line such that the final fill line is placed at a predetermined location on each of the primary neutralizing drum and the secondary neutralizing drum and the final fill line is located above the initial fill line.

A third aspect of the present invention is a method of constructing a system for neutralizing prescription drugs, narcotics and other harmful substances, including the steps of: providing a staging area for an initial collection and sorting of prescription drugs, narcotics and other harmful substances to be neutralized; providing a containment chamber assembly operatively connected to the staging area for granulating the prescription drugs, narcotics and other harmful substances; providing a waste grinder/vacuum assembly operatively connected to the containment chamber for destroying any packaging that contained the prescription drugs, narcotics and other harmful substances; and providing a neutralizing assembly operatively connected to the containment chamber for neutralizing the granulated prescription drugs, narcotics and other harmful substances with a neutralizing agent.

In another embodiment of the third aspect of the present invention, the method further includes the step of providing a back-up drum assembly located adjacent to the neutralizing assembly.

In a further embodiment of the third aspect of the present invention, the step of providing a containment chamber assembly further includes the steps of: providing a containment chamber; providing a waste material grinder/vacuum system entry point operatively connected to the containment chamber, wherein the packaging that contained the prescription drugs, narcotics and other harmful substances is introduced into the waste material grinder/vacuum system entry point; providing a granulator entry point located within the containment chamber; and providing a granulator operatively connected to the granulator entry point for granulating the prescription drugs, narcotics and other harmful substances.

In yet another embodiment of the third aspect of the present invention, the step of providing a waste grinder/vacuum assembly further includes the steps of: providing a grinder operatively connected to the waste material grinder/vacuum system entry point; and providing a grinder vacuum operatively connected to the grinder.

In a yet further embodiment of the third aspect of the present invention, the step of providing a neutralizing assembly further includes the steps of: providing a primary neutralizing drum; providing a vacuum pre-separator operatively connected to the primary neutralizing drum and the containment chamber assembly; providing an agitator operatively connected to the primary neutralizing drum; providing a particulate air vacuum operatively connected to the vacuum pre-separator; and providing a secondary neutralizing drum operatively connected to the particulate air vacuum.

The preferred system and method for neutralizing prescription drugs, narcotics and other harmful substances, according to various embodiments of the present invention, offers the following advantages: ease of use; increased effectiveness in neutralizing prescription drugs, narcotics and other harmful substances; the ability to neutralize a large quantity of prescription drugs, narcotics and other harmful substances in a short period of time; durability; reduced likelihood of the theft of the prescription drugs, narcotics and other harmful substances; compactness in size of the system; the ability to neutralize a wide variety of prescription drugs, narcotics and other harmful substances; ease of disposal of the neutralized prescription drugs, narcotics and other harmful substances; the ability to scale the system to fit a particular end user's needs; the use of carbon-based compounds to neutralize the prescription drugs, narcotics and other harmful substances; the ability to neutralize the prescription drugs, narcotics and other harmful substances to make them unrecoverable; and the ability to operate the system in a safe and friendly environment. In fact, in many of the preferred embodiments, these advantages are optimized to an extent that is considerably higher than heretofore achieved in prior, known prescription drugs, narcotics and other harmful substances disposal systems.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which.

DETAILED DESCRIPTION OF THE PREFERRED EMBODIMENTS OF THE INVENTION

In order to address the shortcomings of the prior, known prescription drugs, narcotics and other harmful substances disposal systems, reference is made now to FIGS. 1-5, where there is illustrated a system 2 for neutralizing prescription drugs, narcotics and other harmful substances (or, more broadly, carbon-based targeted compounds). As will be explained hereinafter in greater detail, the system 2 for neutralizing prescription drugs, narcotics and other harmful substances (the targeted compounds) uses commercially available carbon-based compounds which have been proven to be effective in the adsorption and neutralization of the targeted compounds, thus rendering them "unrecoverable". The system 2 can be made available to law enforcement/ federal/state/local government agencies as well as the pharmaceutical industry as a resource to eliminate targeted compounds in a safe and environmentally friendly process. Finally, this system can be provided in a number of configurations, depending on the needs and ability of the customer as it is scalable in nature and flexible for specific targets.

Figure 1:
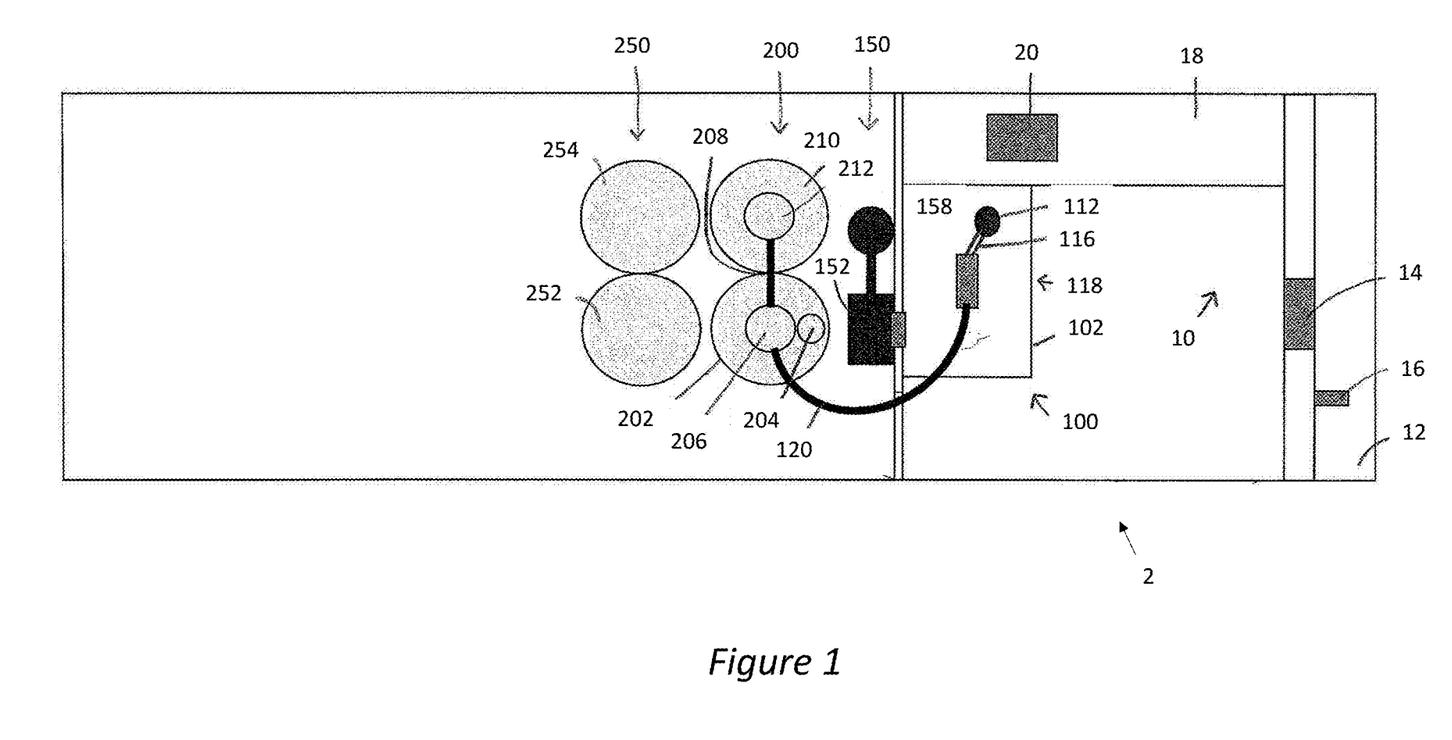
FIG. 1 is a schematic illustration of a system for neutralizing prescription drugs, narcotics and other harmful substances, constructed according the present invention.

As shown in FIG. 1, there is illustrated system 2 for neutralizing prescription drugs, narcotics and other harmful substances (targeted compounds), constructed according to the present invention. System 2 for neutralizing the prescription drugs, narcotics and other harmful substances includes, in part, staging area 10 for the initial collection and sorting of the targeted compounds, the containment chamber assembly 100, the waste grinder/vacuum assembly 150, the targeted compounds neutralizing assembly 120, and the back-up drum assembly 250.

Staging Area for the Initial Collection and Sorting of the Targeted Compounds

With respect to the staging area 10 for the initial collection and sorting of the targeted compounds, as shown in FIG. 1, staging area 10 for the initial collection and sorting of the targeted compounds includes, in part, conventional counter areas 12 and 18, a conventional electronic scale 14, a conventional control module 16 for waste grinder/vacuum system 150, containment chamber assembly 100, and conventional database 20.

A unique aspect of the present invention is the use of staging area 10. In particular, staging area 10 allows for the initial collection and sorting of the targeted compounds. As will be discussed in greater detail later, the targeted compounds are conventionally collected from a variety of well-known sources and brought to system 2 for neutralizing the targeted compounds. The targeted compounds will then be verified by personnel who are authorized to operate the system 2 for neutralizing the targeted compounds. Conventional photographs of the delivered targeted compounds will then be taken and conventionally stored on database 20. The targeted compounds are then conventionally weighed on scale 14 and a time stamp of receipt of the types of targeted materials that have been delivered and weighed is conventionally stored in the database 20.

Containment Chamber Assembly

Regarding containment chamber assembly 100, as shown in FIGS. 1 and 2A-2C, containment chamber assembly 100 includes, in part, containment chamber 102, conventional openings 104 in containment chamber 102 having conventional gloves 106, door 107, conventional viewing window 108, waste material grinder/vacuum system entry point 110, granulator entry point 112, staging area 113 for holding pill packaging, residue collection basin 114, screen 115, vacuum hose 116 from the bottom of residue collection basin 114 to granulator 118, vacuum hose 120 from granulator 118 to targeted compounds neutralizing assembly 200, and conventional targeted compound containers (pill containers) 122. It is to be understood that containment chamber 102, openings 104, gloves 106, viewing window 108, waste material grinder/vacuum system entry point 110, granulator entry point 112, staging area 113, residue collection basin 114, screen 115, vacuum hose 116, and vacuum hose 120 are to be constructed of any suitable, durable, corrosion resistant material.

Figure 2A:
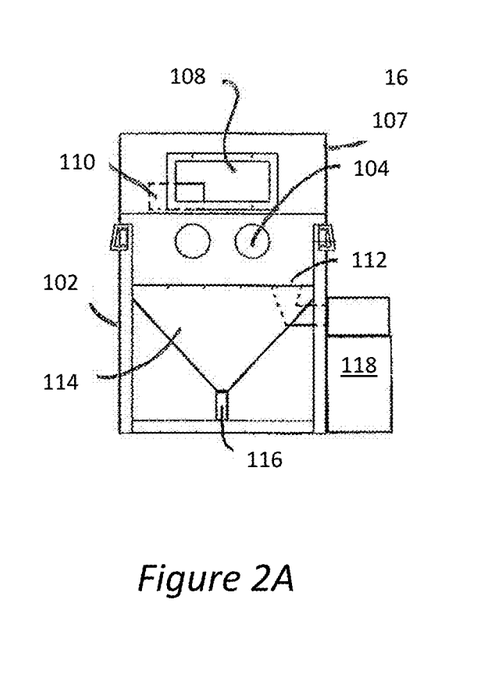
FIG. 2A is a front view of a containment chamber, constructed according the present invention.
Figure 2B:
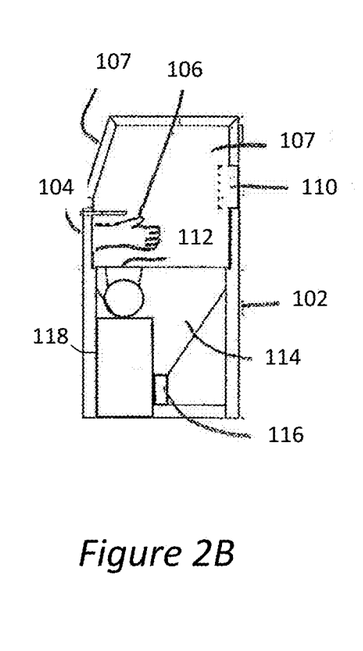
FIG. 2B is a side view of the containment chamber of FIG. 2a, constructed according the present invention.
Figure 2C:
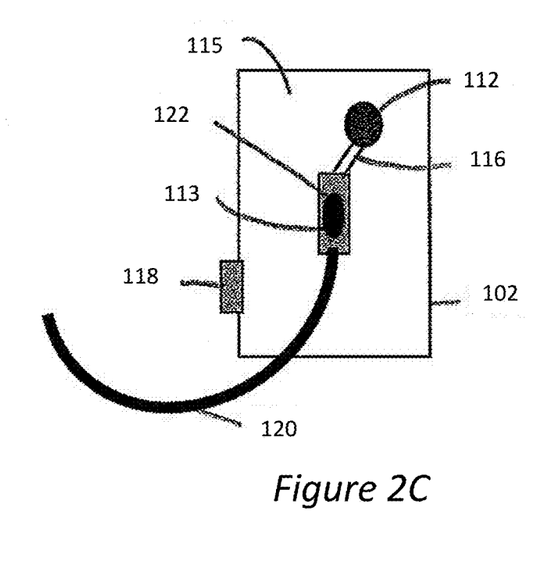
FIG. 2C is a schematic illustration of the containment chamber showing the vacuum connection between the containment chamber and the targeted compounds neutralizing assembly, constructed according to the present invention.

Another unique aspect of the present invention is the use of screen 115. In particular, after the vacuum systems of waste grinder/vacuum system 150 and compounds neutralizing assembly 200 are activated, the pill containers 122 having the targeted compounds held within the pill containers 122 are placed inside of containment chamber 102 by opening door 107 and placing the pill containers 122 on the staging area 113. Preferably, staging area 113 is a sheet of metal of other durable, non-slip material such that the staging area 113 is firmly secured to the screen 115 by conventional attaching techniques. The door 107 is closed, thereby creating a vacuum within containment chamber 102. The operator then conventionally uses gloves 106 to dump the targeted material into the granulator entry point 112 to be subsequently granulated by granulator 118. The operator will then use gloves 106 to invert or otherwise turn the pill container 122 over so that the open end of the pill container 122 is now located over a portion of the screen 115. The operator will then tap or contact the inverted pill container 122 against the screen 115 to cause any residue from the targeted compounds that are remaining in the pill container 122 after the targeted compounds have been deposited into the granulator entry point 112 to fall through the screen 115 and collect in the residue collection basin 114 so that the targeted compounds residue can then be transported to the compounds neutralizing assembly 200, as will be discussed in greater detail later.

Another further unique aspect of the present invention is the use of granulator 118. It is to be understood that granulator 118 should be constructed so that granulator 118 is capable of quickly and effectively granulating any prescription drugs, narcotics and other harmful substances (targeted compounds). In particular, granulator 118 should be able to easily granulate the targeted compounds so that the granulated targeted compounds can be subsequently neutralized in the targeted compounds neutralizing assembly 200 in a safe, efficient and environmentally-friendly manner, as will be discussed in greater detail later.

A further unique aspect of the present invention is the use of the waste material grinder/vacuum system entry point 110 and the waste grinder/vacuum assembly 150 (FIGS. 1 and 3A-3C). As will be discussed in greater detail later, sometimes the targeted compounds that are delivered to the system 2 for neutralizing the targeted compounds are delivered in pill containers 122 or other similar such packaging that contain personal information on the pill containers 122 about the person to whom the prescription was filled. It is highly desirous to be able to destroy the pill containers 122 once the pill containers 122 having the targeted compounds have been delivered to the system 2 for neutralizing the targeted compounds. In order to completely destroy the pill containers 122 or other similar such packaging, once the targeted compounds have been removed from the pill containers 122 and further processed, as described above, the pill containers 122 are then placed in waste material grinder/vacuum system entry point 110. As will be discussed later, the pill containers 122 then interact with the grinder 152 so that the pill containers 122 are effectively pulverized. In this manner, any personal or other sensitive information that may have been placed on the pill containers 122 has been destroyed. The pulverized pill containers 122 are then disposed of according to the applicable federal/state/local regulations, as will be discussed in greater detail later.

Waste Grinder/Vacuum Assembly

With respect to waste grinder/vacuum assembly 150, as shown in FIGS. 1 and 3A-3C, waste grinder/vacuum assembly 150 includes, in part, waste material grinder/vacuum system entry point 110, a conventional grinder 152, conventional hose 154 from waste material grinder/vacuum system entry point 110 to grinder 152, and conventional hose 156 from grinder 152 to grinder vacuum 158. It is to be understood that hoses 154 and 156 are to be constructed of any suitable, durable, corrosion resistant material.

Figure 3A:
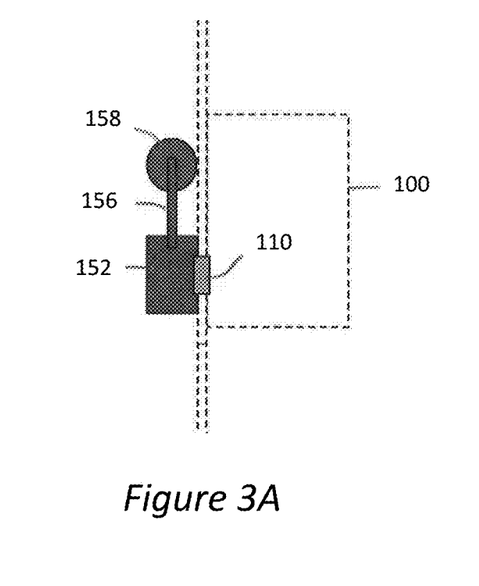
FIG. 3A is a schematic top, plan view of the waste material grinder/vacuum assembly, constructed according to the present invention.
Figure 3B:
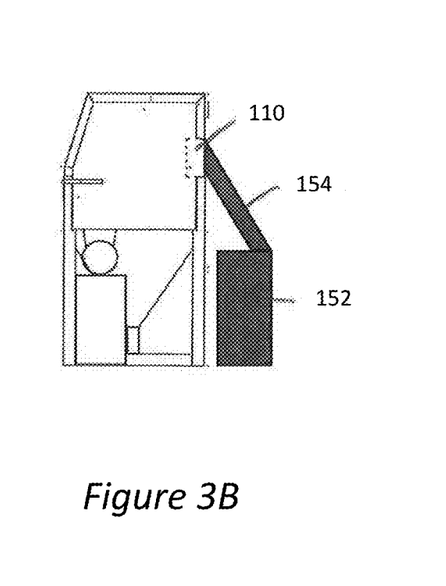
FIG. 3B is a schematic side elevational view of the waste material grinder/vacuum assembly of FIG. 3a showing the waste material grinder/vacuum assembly being attached to the containment chamber, constructed according to the present invention.
Figure 3C:
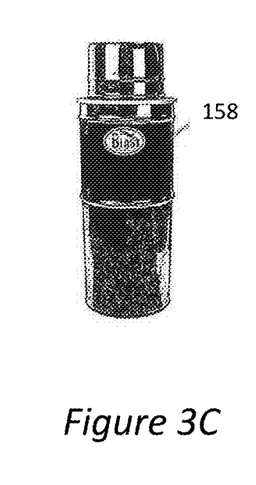
FIG. 3C is a schematic illustration of a grinder vacuum, constructed according the present invention.

Another unique aspect of the present invention is the use of waste grinder/vacuum assembly 150. As will be described in greater detail later, waste grinder/vacuum assembly 150 allows the end user to place the pill containers 122 or other similar packaging used to hold the prescription drugs, narcotics and other harmful substances (targeted compounds) in waste grinder/vacuum assembly 150 to effectively pulverize and securely dispose of the pill containers 122 through the use of the grinder 152. In particular, the grinder 152 should be constructed so as to be able to completely pulverize the pill containers 122 and, thereby, substantially destroy any personal information located on the pill containers 122. The grinder vacuum 158 should also be constructed such that any pulverized material in the grinder 152 should be evacuated to grinder vacuum 158 so that the pulverized pill container material can be safely and securely disposed, according to the federal/state/local regulations, as will be discussed in greater detail later.

Targeted Compounds Neutralizing Assembly

Figure 4:
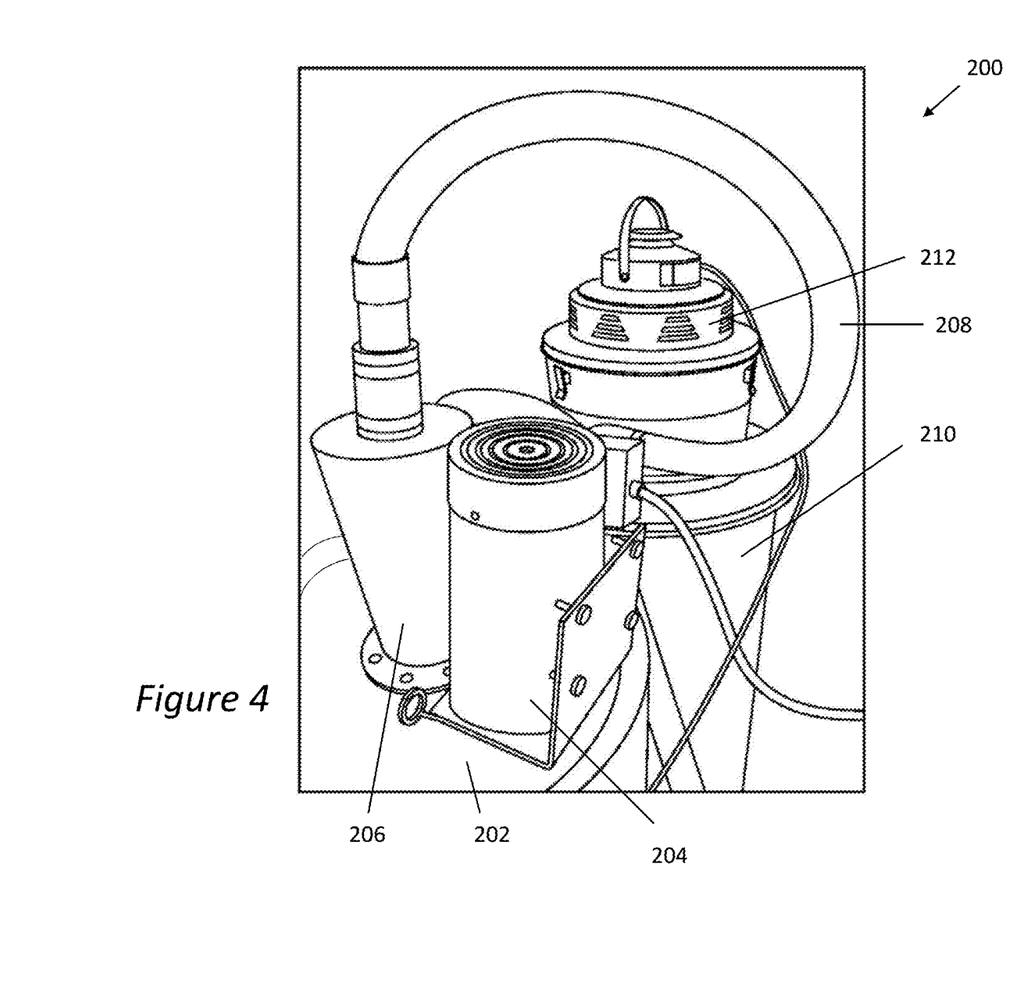
FIG. 4 is an isometric illustration of the agitator and the vacuum assembly of the targeted compounds neutralizing assembly showing the connection of the vacuum tubes, constructed according the present invention.

Regarding targeted compounds neutralizing assembly 200, as shown in FIGS. 1 and 4, targeted compounds neutralizing assembly 200 includes, in part, primary neutralizing drum 202, conventional agitator 204, conventional vacuum pre-separator 206, conventional vacuum hose 208 from vacuum pre-separator 206 to conventional high-efficiency particulate air (HEPA) vacuum 212, and secondary neutralizing drum 210. It is to be understood that hose 208 is to be constructed of any suitable, durable, corrosion resistant material. It is to be further understood that agitator 204 is to be constructed so that agitator 204 is able to efficiently mix the neutralizing agent contained within primary drum 202 with any targeted compounds that are introduced into primary drum 202 through vacuum hose 120 into vacuum pre-separator 206.

A further unique aspect of the present invention is the use of vacuum pre-separator 206. As will be discussed in greater detail later, once the targeted compounds have been granulated by granulator 118, vacuum hose 120 is used to transport the granulated targeted compounds to vacuum pre-separator 206. Also, any residual targeted compounds that has been collected by residue collection basin 114 is transported via granulator 118 to vacuum pre-separator 206 through vacuum hose 120, as discussed above. Once the granulated target compounds and the residual targeted compounds have been transported to vacuum pre-separator 206, vacuum pre-separator 206 operates to conventionally separate out any larger chunks or pieces of granulated targeted compounds. The larger pieces of granulated targeted compounds then drop down into primary neutralizing drum 202. The smaller pieces of granulated targeted compounds are then transported by high-efficiency particulate air (HEPA) vacuum 212 through the use of hose 208 so that the smaller pieces of targeted compounds are dropped into secondary neutralizing drum 210 to be neutralized in secondary neutralizing drum 210.

Back-Up Drum Assembly

Figure 5:
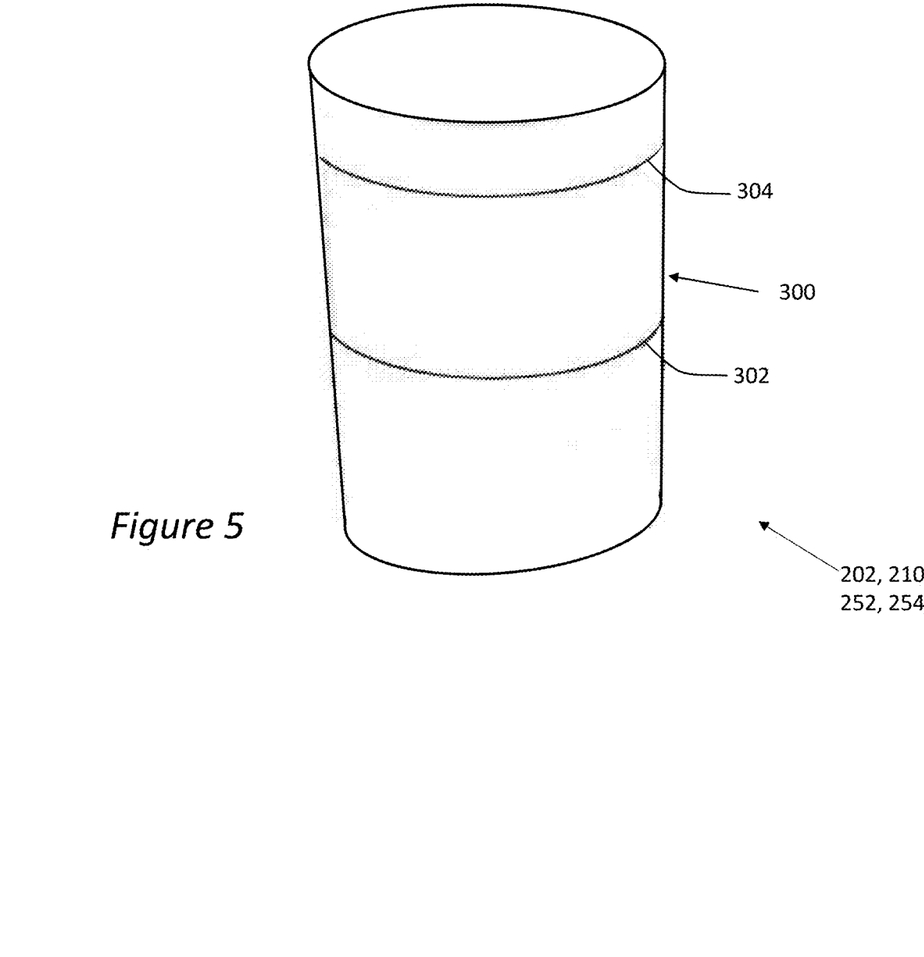
FIG. 5 is an isometric illustration of the fill lines on the neutralizing drums, constructed according the present invention.

With respect to back-up drum assembly 250, as shown in FIGS. 1 and 5, back-up drum assembly 250, includes, in part, back-up neutralizing drums 252 and 254. It is to be understood that back-up drums 252 and 254 should be constructed in substantially the same manner as primary neutralizing drum 202 and secondary neutralizing drum 210.

Another unique aspect of the present invention is the use of a fill level indication system 300 that is to be placed on all of the neutralizing drums 202, 210, 252 and 254. In particular, each of the neutralizing drums 202, 210, 252 and 254 is filled with a carbon-based neutralizing agent such that the volume of the neutralizing agent should reach the initial fill line 302. As will be described in greater detail later, once the amount of granulated targeted compounds and residual targeted compounds that have been introduced into neutralizing drum 202, for example, has caused the volume of the neutralizing agent/neutralized targeted compounds to reach the final fill line 304, the system 2 for neutralizing the targeted compounds is shut down and another neutralizing drum is substituted in place of the filled primary neutralizing drum 202.

Neutralizing Agent

Regarding the neutralizing agent that is to be used in system 2 for neutralizing the targeted compounds, it is to be understood that the neutralizing agent can be any suitable carbon-based neutralizing agent, preferably the neutralizing agent disclosed in U.S. Pat. No. 9,403,197 by Dallas et al. Of great importance is that the neutralizing agent should be able to dissolve and disperse the granulated/residual targeted compounds and include a hardening agent that solidifies the disposal solution to prevent it from contaminating the environment after disposal. Furthermore, the neutralizing agent should include a neutralizer which binds (through adsorption) to the granulated/residual targeted compounds to render the granulated/residual targeted compounds inert by creating a film of adsorbate on the surface of the granulated/residual targeted compounds. Finally, the neutralizing agent can optionally include defoaming, preservation and/or antifreeze agents.

Operation of the System for Neutralizing the Targeted Compounds

During the operation of system 2 for neutralizing the targeted compounds, attention is directed to FIGS. 1-5. In particular, after the system 2 for neutralizing the targeted compounds has been constructed, as discussed above and shown in FIGS. 1-5, the operation of system 2 for neutralizing the targeted compounds begins when the prescription drugs, narcotics and other harmful substances (carbon-based targeted compounds) are delivered to system 2 for neutralizing the targeted compounds. The operation of system 2 for neutralizing the targeted compounds is then broken down into the following steps:

A. Receipt and Acknowledgement;
B. Containment;
C. Separation;
D. Processing;
E. Dwell Time (Post-Processing);
F. Testing Upon Completion; and
G. Disposal.

Receipt and Acknowledgement

During the receipt and acknowledgement phase of the operation, as discussed above, the targeted compounds are conventionally collected from a variety of well-known sources and brought to system 2 for neutralizing the targeted compounds. The targeted compounds will then be verified by personnel who are authorized to operate the system 2 for neutralizing the targeted compounds. Conventional photographs of the delivered targeted compounds will then be taken and conventionally stored on database 20. The targeted compounds are then conventionally weighed on electronic scale 14 and a time stamp of the receipt of the types of targeted compounds that have been delivered and weighed is conventionally stored in the database 20.

Containment

Once the targeted compounds have been received and acknowledged in staging area 10, staging area 10 is secured and non-essential personnel are removed. At this point, grinder vacuum 158 in waste grinder/vacuum assembly 150 and vacuum pre-separator 206 and high-efficiency particulate air (HEPA) vacuum 212 are powered up prior to any manipulation of the targeted compounds. It is to be understood that any personnel operating system 2 for neutralizing the targeted compounds will be required to wear the required protective gear that is mandated by federal/state/local regulations.

Separation

After the targeted compounds have been contained, the targeted compounds are placed on the counters 12 and/or 18 and physically separated from their provided packaging (for example, pill containers 122) to be processed separately, as discussed above. The targeted compounds are then weighed on electronic scale 14 and the weight is conventionally recorded (such as through the use of a computer or other similar device (not shown) and conventionally stored on database 20. The targeted compounds and the packaging are then each staged at the containment chamber 102 for separate processing, as discussed above.

Processing

Once the targeted compounds and the packaging have been separated, the door 107 is opened and the packaging is placed within containment chamber 102. The packaging is processed by placing the packaging into the waste material grinder/vacuum system entry point 110 so that the packaging is transported to the grinder 152 such that the packaging is processed and ground by grinder 152 to destroy all labeling and packaging, as discussed above. Finally, the ground-up packaging is conventionally inspected prior to being released to ensure destruction of the markings/labels and other sensitive information.

After the packaging has been destroyed, the targeted compounds are then deposited into the granulator 118 through granulator entry point 112 where the targeted compounds are processed and ground by granulator 118 to an even consistency. The ground targeted compounds are then automatically vacuumed away from granulator 118 and residue collection basin 114 by vacuum pre-separator 206. It is to be understood that the agitator 204 is activated when vacuum pre-separator 206 is activated.

It is to be further understood that the targeted compounds are slowly added to granulator 118 through granulator entry point 112. It is to be further understood that the granulation speed (RPM) of the granulator 118 should be set at the specified speed for the desired and specified targeted compound based upon the type and volume of the targeted compound. Once the targeted compound has been granulated, the granulated/residual targeted compounds are then transported to the vacuum pre-separator 206, where the larger and smaller pieces of the granulated targeted compounds are separated, as discussed above.

Upon separation, the larger granules of targeted compounds will deposit into the primary neutralizing drum 202 and remaining smaller granules will be transported to the secondary neutralizing drum 210 via high-efficiency particulate air (HEPA) vacuum 212 and hose 208, as discussed above.

As the targeted compounds are being granulated and placed into primary neutralizing drum 202 and secondary neutralizing drum 210, the volume of the neutralizing agent/granulated targeted compounds is monitored by checking the fill level lines 302 and 304. As discussed above, usually the primary neutralizing drum 202 will reach its final fill line 304 first. Once this happens, system 2 for neutralizing the targeted compounds is powered down and the vacuum pre-separator 206 and the agitator 204 are conventionally removed from the top of primary neutralizing drum 202. A conventional lid (not shown) is then secured to the top of the filled primary neutralizing drum 202. The covered, filled primary neutralizing drum 202 is then conventionally placed in a secure location for further disposal, as will be described in greater detail later.

After the filled, primary neutralizing drum 202 has been covered and removed from the targeted compounds neutralizing assembly 200, the high-efficiency particulate air (HEPA) vacuum 212 is conventionally removed from secondary neutralizing drum 210. Secondary neutralizing drum 210 is then carefully slide over to where primary neutralizing drum 202 was located so that secondary neutralizing drum 210 will now become the new primary neutralizing drum. The vacuum pre-separator 206 and the agitator 204 are then conventionally placed on the top of the new primary neutralizing drum 202. Once the secondary neutralizing drum 210 has replaced the filled, primary neutralizing drum 202, one of the back-up neutralizing drums 252 or 254 will then be conventionally moved to the location where secondary neutralizing drum 210 used to be so that the back-up neutralizing drum 252/254 is now the new secondary neutralizing drum 210. After the back-up neutralizing drum 252 or 254 has been placed where secondary neutralizing drum 210 used to be, the high-efficiency particulate air (HEPA) vacuum 212 is placed on top of the new secondary neutralizing drum 210 and the system 2 for neutralizing the targeted compounds is powered up.

It is to be understood that once all the targeted compounds have been processed, the containment chamber 102 is conventionally cleaned with forced air while the vacuum pre-separator 206 and the high-efficiency particulate air (HEPA) vacuum 212 are powered on. Furthermore, once the containment chamber 102 is cleaned, the containment chamber 102 is conventionally purged with a carbon-neutralizer throughout the containment chamber 102 including the grinder 152, the granulator 118, the vacuum hoses 116, 120, 154, 156, and 208, the vacuum pre-separator 206, and the high-efficiency particulate air (HEPA) vacuum 212. It is to be further understood that any filters (not shown) used in the vacuum pre-separator 206, the high-efficiency particulate air (HEPA) vacuum 212 and the containment chamber 102 are conventionally processed and discarded after each use, in accordance with mandated federal/state/local regulations.

Dwell Time

It is to be understood that the time that the granulated/residual targeted compounds spend in the neutralizing agent (dwell time) will vary depending upon the physical size and chemical composition of the targeted compound. It is to be further understood that the physical size of the targeted compound refers to the granulation size of the granulated targeted compound. Preferably, the dwell times will be provided for each specific scenario. Once the required dwell time has been completed, the targeted compound will be conventionally tested to determine that, in fact, the targeted compound has been effectively neutralized (or rendered inert).

Testing Upon Completion

It is to be understood that further on-site testing can be conducted with post-processed targeted compounds, upon request, to demonstrate the non-reversible process. However, it is to be understood that the further processing may vary with each customer.

Disposal

As discussed above, the filled, neutralizing drums will be disposed of according to all applicable federal/state/local regulations. However, it is to be further understood that the filled, neutralizing drums may also be surrendered to the federal/state/local agency that initially delivered the targeted compounds to the system 2 for neutralizing the targeted compounds.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not specifically set forth in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to limit the invention, except as indicated in the appended claims.

Therefore, provided herein is a new and improved system and method for neutralizing prescription drugs, narcotics and other harmful substances. The preferred system and method for neutralizing prescription drugs, narcotics and other harmful substances, according to various embodiments of the present invention, offers the following advantages: ease of use; increased effectiveness of neutralizing prescription drugs, narcotics and other harmful substances; the ability to neutralize a large quantity of prescription drugs, narcotics and other harmful substances in a short period of time; durability; reduced likelihood of the theft of the prescription drugs, narcotics and other harmful substances; compactness in size of the system; the ability to neutralize a wide variety of prescription drugs, narcotics and other harmful substances; ease of disposal of the neutralized prescription drugs, narcotics and other harmful substances; the ability to scale the system to fit a particular end user's needs; the use of carbon-based compounds to neutralize the prescription drugs, narcotics and other harmful substances; the ability to neutralize the prescription drugs, narcotics and other harmful substances to make them unrecoverable; and the ability to operate the system in a safe and friendly environment. In fact, in many of the preferred embodiments, these advantages of ease of use, increased effectiveness of neutralizing prescription drugs, narcotics and other harmful substances, the ability to neutralize a large quantity of prescription drugs, narcotics and other harmful substances in a short period of time, durability, reduced likelihood of the theft of the prescription drugs, narcotics and other harmful substances, compactness in size of the system, the ability to neutralize a wide variety of prescription drugs, narcotics and other harmful substances, ease of disposal of the neutralized prescription drugs, narcotics and other harmful substances, the ability to scale the system to fit a particular end user's needs, the use of carbon-based compounds to neutralize the prescription drugs, narcotics and other harmful substances, the ability to neutralize the prescription drugs, narcotics and other harmful substances to make them unrecoverable, and the ability to operate the system in a safe and friendly environment are optimized to an extent that is considerably higher than heretofore achieved in prior, known systems and methods for neutralizing prescription drugs, narcotics and other harmful substances.

We claim:

1. A system for neutralizing prescription drugs, narcotics and other harmful substances, comprising:
   a staging area for an initial collection and sorting of prescription drugs, narcotics and other harmful substances to be neutralized;
   a containment chamber assembly operatively connected to the staging area for granulating the prescription drugs, narcotics and other harmful substances;
   a waste grinder assembly operatively connected to the containment chamber for destroying any packaging that contained the prescription drugs, narcotics and other harmful substances, wherein the waste grinder assembly further includes a vacuum assembly operatively connected to the waste grinder assembly; and
   a neutralizing assembly operatively connected to the containment chamber for neutralizing the granulated prescription drugs, narcotics and other harmful substances, with a neutralizing agent, wherein the neutralizing assembly is further comprised of:
   a primary neutralizing drum;
   a vacuum pre-separator operatively connected to the primary neutralizing drum and the containment chamber assembly;
   an agitator operatively connected to the primary neutralizing drum;
   a particulate air vacuum operatively connected to the vacuum pre-separator; and
   a secondary neutralizing drum operatively connected to the particulate air vacuum.

2. The system for neutralizing prescription drugs, narcotics and other harmful substances, according to claim 1, wherein the system is further comprised of:
   back-up drum assembly located adjacent to the neutralizing assembly.

3. The system for neutralizing prescription drugs, narcotics and other harmful substances, according to claim 1, wherein the staging area is further comprised of:
   a scale; and
   a database for storing information related to the prescription drugs, narcotics and other harmful substances that have been collected and sorted.

4. The system for neutralizing prescription drugs, narcotics and other harmful substances, according to claim 1, wherein the containment chamber assembly is further comprised of:
   a containment chamber;
   a waste material grinder system entry point operatively connected to the containment chamber, wherein the packaging that contained the prescription drugs, narcotics and other harmful substances is introduced into the waste material grinder system entry point;
   a granulator entry point located within the containment chamber; and
   a granulator operatively connected to the granulator entry point for granulating the prescription drugs, narcotics and other harmful substances.

5. The system for neutralizing prescription drugs, narcotics and other harmful substances, according to claim 4, wherein the waste grinder assembly is further comprised of:
   a grinder operatively connected to the waste material grinder system entry point; and
   a grinder vacuum operatively connected to the grinder.

6. The system for neutralizing prescription drugs, narcotics and other harmful substances, according to claim 2, wherein the back-up drum assembly is further comprised of:
   a plurality of back-up drums.

7. The system for neutralizing prescription drugs, narcotics and other harmful substances, according to claim 1, wherein the primary neutralizing drum and the secondary neutralizing drum are further comprised of:
   an initial final fill line such that the initial fill line is placed at a predetermined location on each of the primary neutralizing drum and the secondary neutralizing drum; and
   a final fill line such that the final fill line is placed at a predetermined location on each of the primary neutralizing drum and the secondary neutralizing drum and the final fill line is located above the initial fill line.

8. A system for rendering inert carbon-based targeted compounds, comprising:
   a staging area for an initial collection and sorting of carbon-based targeted compounds to be rendered inert;
   a containment chamber assembly operatively connected to the staging area for granulating the carbon-based targeted compounds;
   a waste grinder assembly operatively connected to the containment chamber for destroying any packaging that contained the carbon-based targeted compounds, wherein the waste grinder assembly further includes a vacuum assembly operatively connected to the waste grinder assembly;
   a neutralizing assembly operatively connected to the containment chamber for rendering inert the granulated carbon-based targeted compounds with a neutralizing agent, wherein the neutralizing assembly is further comprised of:
   a primary neutralizing drum;
   a vacuum pre-separator operatively connected to the primary neutralizing drum and the containment chamber assembly;
   an agitator operatively connected to the primary neutralizing drum;
   a particulate air vacuum operatively connected to the vacuum pre-separator; and
   a secondary neutralizing drum operatively connected to the particulate air vacuum; and
   a back-up drum assembly located adjacent to the neutralizing assembly.

9. The system for rendering inert carbon-based targeted compounds, according to claim 8, wherein the staging area is further comprised of:
   a scale; and
   a database for storing information related to the carbon-based targeted compounds that have been collected and sorted.

10. The system for rendering inert carbon-based targeted compounds, according to claim 8, wherein the containment chamber assembly is further comprised of:
    a containment chamber;
    a waste material grinder system entry point operatively connected to the containment chamber, wherein the packaging that contained the carbon-based targeted compounds is introduced into the waste material grinder system entry point;
    a granulator entry point located within the containment chamber; and a granulator operatively connected to the granulator entry point for granulating the carbon-based targeted compounds.

11. The system for rendering inert carbon-based targeted compounds, according to claim 10, wherein the waste grinder assembly is further comprised of:
a grinder operatively connected to the waste material grinder/vacuum system entry point; and a grinder vacuum operatively connected to the grinder.

12. The system for rendering inert carbon-based targeted compounds, according to claim 8, wherein the back-up drum assembly is further comprised of:
a plurality of back-up drums.

13. The system for rendering inert carbon-based targeted compounds, according to claim 8, wherein the primary neutralizing drum and the secondary neutralizing drum are further comprised of:
an initial final fill line such that the initial fill line placed at a predetermined location on each of the primary neutralizing drum and the secondary neutralizing drum; and
a final fill line such that the final fill line is placed at a predetermined location on each of the primary neutralizing drum and the secondary neutralizing drum and the final fill line is located above the initial fill line.

14. A method of constructing a system for neutralizing prescription drugs, narcotics and other harmful substances, comprising the steps of:
providing a staging area for an initial collection and sorting of prescription drugs, narcotics and other harmful substances to be neutralized;
providing a containment chamber assembly operatively connected to the staging area for granulating the prescription drugs, narcotics and other harmful substances;
providing a waste grinder assembly operatively connected to the containment chamber for destroying any packaging that contained the prescription drugs, narcotics and other harmful substances, wherein the waste grinder assembly further includes a vacuum assembly operatively connected to the waste grinder assembly; and
providing a neutralizing assembly operatively connected to the containment chamber for neutralizing the granulated prescription drugs, narcotics and other harmful substances with a neutralizing agent, wherein the step of providing a neutralizing assembly is further comprised of the steps of:
providing a primary neutralizing drum;
providing a vacuum pre-separator operatively connected to the primary neutralizing drum and the containment chamber assembly;
providing an agitator operatively connected to the primary neutralizing drum; providing a particulate air vacuum operatively connected to the vacuum pre-separator; and
providing a secondary neutralizing drum operatively connected to the particulate air vacuum.

15. The method of constructing a system for neutralizing prescription drugs, narcotics and other harmful substances, according to claim 14, wherein the method is further comprised of the step of:
providing a back-up drum assembly located adjacent to the neutralizing assembly.

16. The method of constructing a system for neutralizing prescription drugs, narcotics and other harmful substances, according to claim 14, wherein the step of providing a containment chamber assembly is further comprised of the steps of:
providing a containment chamber;
providing a waste material grinder system entry point operatively connected to the containment chamber, wherein the packaging that contained the prescription drugs, narcotics and other harmful substances is introduced into the waste material grinder system entry point;
providing a granulator entry point located within the containment chamber; and
providing a granulator operatively connected to the granulator entry point for granulating the prescription drugs, narcotics and other harmful substances.

17. The method of constructing a system for neutralizing prescription drugs, narcotics and other harmful substances, according to claim 16, wherein the step of providing a waste grinder assembly is further comprised of the steps of:
providing a grinder operatively connected to the waste material grinder system entry point; and
providing a grinder vacuum operatively connected to the grinder.

* * * * *